United States Patent [19]

Bultman

[11] 4,238,336

[45] Dec. 9, 1980

[54] SLUDGE DIFFUSION METHOD AND APPARATUS

[76] Inventor: Lynn E. Bultman, 3877 Highway 70, St. Charles, Mo. 63301

[21] Appl. No.: 42,042

[22] Filed: May 24, 1979

[51] Int. Cl.³ .............................................. B01D 21/00
[52] U.S. Cl. ..................................... 137/13; 210/220; 210/513; 366/107
[58] Field of Search ....................... 366/101, 106, 107; 210/49, 57, 58, 83, 84, 220, 513, 519, 241; 261/24

[56] References Cited

U.S. PATENT DOCUMENTS

| | | | |
|---|---|---|---|
| 1,971,852 | 8/1934 | Goebels | 366/107 |
| 3,140,259 | 7/1964 | Kelly | 210/519 |
| 3,174,733 | 3/1965 | Chase | 210/220 |
| 3,662,781 | 5/1972 | Figliola et al. | 210/220 |
| 3,676,075 | 7/1972 | Ploger | 366/101 |
| 3,773,297 | 11/1973 | Steltz | 366/107 |
| 3,862,746 | 1/1975 | Franz | 366/101 |
| 3,965,013 | 6/1976 | Jackson | 210/519 |
| 4,060,486 | 11/1977 | Scheeiber | 210/220 |
| 4,092,338 | 5/1978 | Tossey | 210/83 |
| 4,160,734 | 7/1979 | Taylor | 210/241 |
| 4,165,286 | 8/1979 | Schreiber et al. | 210/220 |

Primary Examiner—Ernest G. Therkorn
Attorney, Agent, or Firm—Schmidt, Johnson, Hovey & Williams

[57] ABSTRACT

A diffuser for the treatment of waste sludge utilizes low pressure air injected from below to produce a bed capable of being handled as a fluid such as to permit pumping from a sedimentation basin to a tank truck for transport to a point of use or disposal. A system of air discharge pipes strategically located in the basin below the sludge connects with common air receiving manifold at the periphery of the basin, and a complete valve arrangement permits control of the air discharge to accommodate for all types of sludge under various conditions as required prior to and during emptying of the contents of the basin.

20 Claims, 8 Drawing Figures

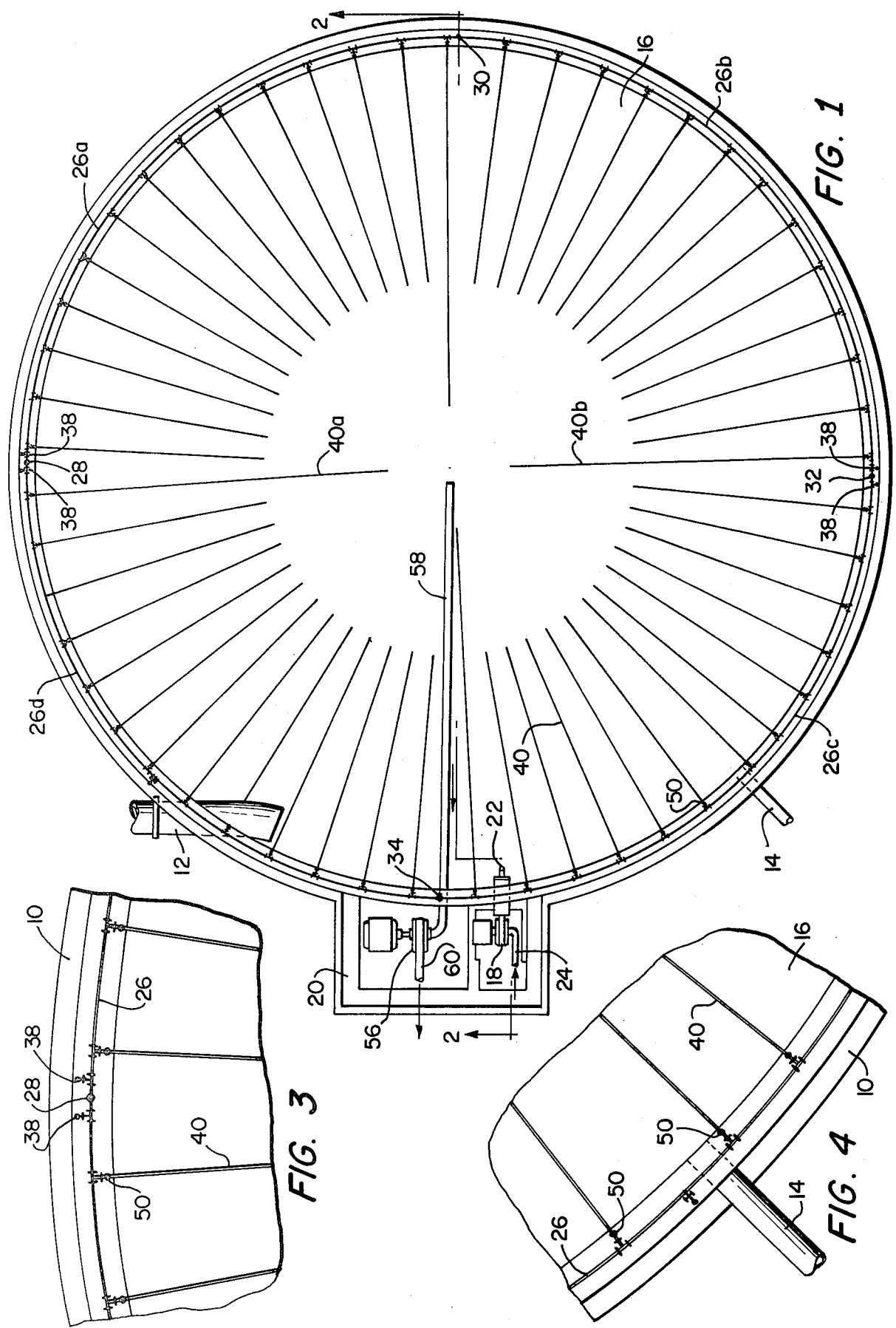

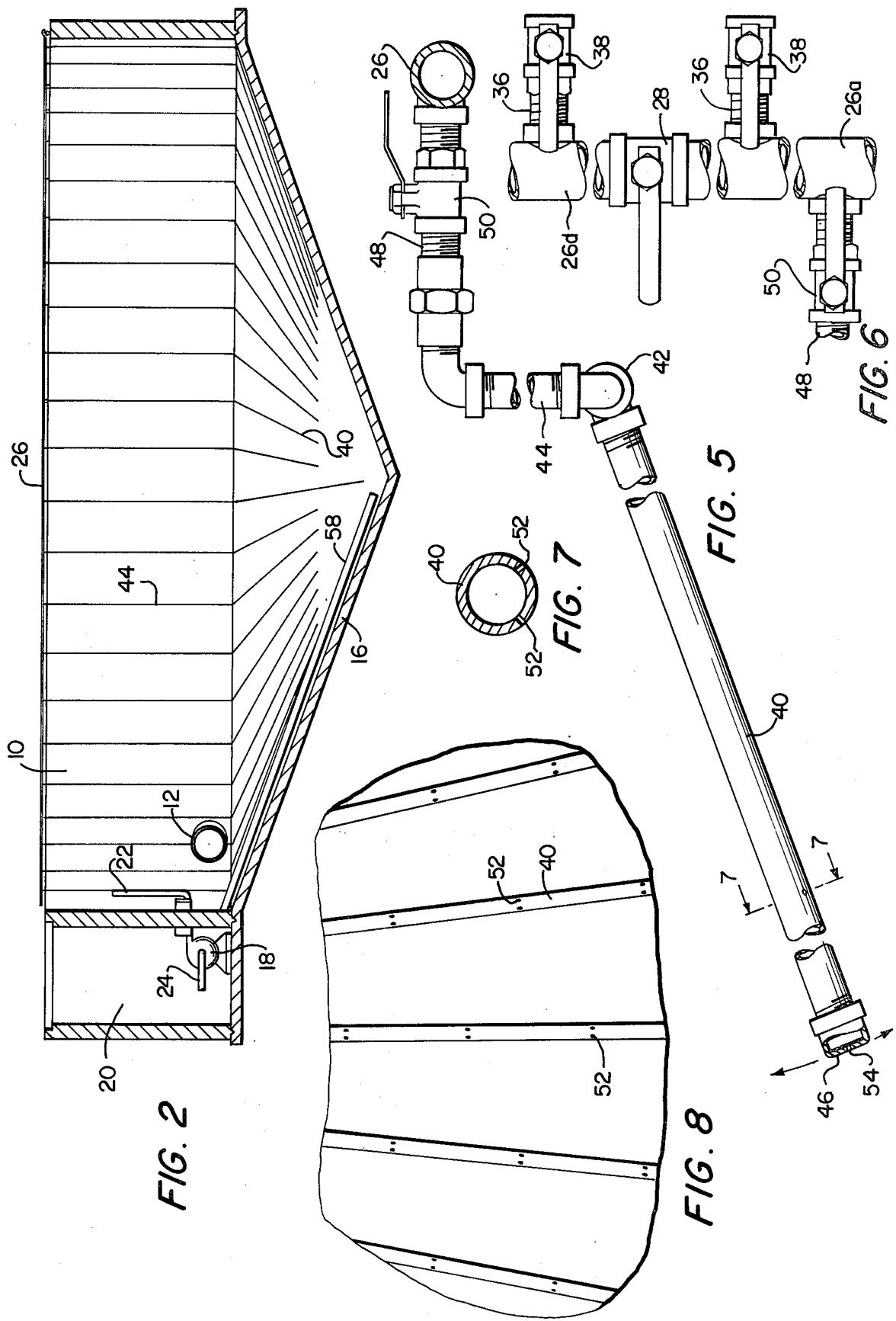

SLUDGE DIFFUSION METHOD AND APPARATUS

The protection of the environment by reduction and control of pollution which affects such physical factors as water and soil has created many problems relating to the disposal of wastes in a manner to avoid contamination of the earth, streams and atmosphere. The problems are not limited to industry, e.g., the discharge of effluents (factory waste products) inasmuch as sewage, encompassing all kitchen, body, laundry and household cleaning wastes, must also be disposed of with care.

Included also are wastes resulting from water purification involving rather complex water treatment plants. For example, raw river water may require screening at the intake followed by pumping to sedimentation tanks. Oftentimes a flocculant, such as chlorinated ferrous sulphate, and a softener (lime slurry) are added at the beginning of the process, the lime also regulating acidity.

Usually the sludge formed in the sedimentation tank is pumped to a sludge basin from which the clear water is recycled. Activated carbon may be added to absorb impurities and thereby reduce unacceptable taste, odor and color. Sulphur dioxide may be used as a dechlorinator. The principle processes of water treatment, therefore, include sedimentation, filtration, aeration and sterilization.

Manifestly, the sedimentation phase results in solid particles in the water slowly settling to the bottom of large, shallow basins. Its efficiency can be increased by adding alum or other flocculant to cause smaller particles to come together.

Heretofore, it has been necessary to provide for constant stirring or agitation, usually by use of a sweep arm rotating slowly within the sludge basin, oftentimes for as long as six months prior to pumping of the sludge into the tank of a sludge removal vehicle. Otherwise, the sludge sets up into such an extremely dense condition as to prevent removal by pumping procedures. The high energy requirements and substantial costs for maintaining the sludge in a condition for handling as a fluid have not been previously eliminated.

To some extent, many of the same problems exist in the treatment of sewage. Disposal of diluted sewage into lakes and rivers is neither satisfactory nor any longer fully condoned, especially in high population and dense industry areas. Sewage treatment processes require reduction of the so-called "biochemical oxygen demand" to a very low figure.

Therefore, modern sewage treatment utilizes both natural oxidation and putrefection processes as well as screening, sedimentation, flocculation, digestion, aeration, filtration and chlorination processes. The sludge, when dried, may be used as fertilizer, whereas the lime utilized in water treatment plants provides for necessary soil stabilization, operative to control acid-alkaline imbalance.

Industrial effluents often require other special treatment and additives, but in all instances, a solution to the problems presented by the resultant sludges and their disposal can no longer be ignored.

In accordance with my present invention, the need for constant agitation with resultant costs is entirely eliminated. Instead, the sludge may be permitted to remain in the collection or holding basin for indefinite periods of time, notwithstanding the fact that in absence of stirring the density of the material progressively increases such as to become extremely heavy, thick and quasi-solid.

At the time it becomes necessary or desirable to remove the sludge, whether on a daily basis or after an extended period of time, it is but necessary in accordance with the instant invention to inject air into the material at certain locations in order to place it in condition for pumping. While the nature of the sludge, particularly that having a high concentration of lime, made it to appear as if the method would be unworkable, and while solution to the previous problems had previously been quite obscure, unexpectedly, low volumes of air, without need for high velocities, have proved to be quite adequate through use of the apparatus about to be described and through use of the process itself, all at relatively small costs.

In the drawings:

FIG. 1 is a top plan view, partially schematic, illustrating a sludge diffusing apparatus made in accordance with the instant invention and capable of carrying out the novel sludge diffusion process hereof;

FIG. 2 is a cross sectional view taken on irregular line 2—2 of FIG. 1, also schematic in part.

FIG. 3 is a fragmentary view similar to FIG. 1 on a slightly enlarged scale;

FIG. 4 is a view similar to FIG. 3 but at a different area within the apparatus;

FIG. 5 is an enlarged view partially in section illustrating one of the air discharge pipes in association with its connection with the air receiving manifold;

FIG. 6 is a fragmentary plan view similar to FIG. 5 showing a portion of the valve control arrangement;

FIG. 7 is a cross sectional view still further enlarged taken on line 7—7 of FIG. 5; and FIG. 8 is a fragmentary view similar to FIG. 1 on an enlarged scale.

For purposes of illustration only a cylindrical basin 10 (FIGS. 1 and 2) is shown for receiving sludge through its open top as well as through a backwash line 12, there being a drainage line 14 (FIGS. 4 and 5) at about the same elevation as the line 12 for decanting of water which results from settling of the solid waste toward a bottom 16 of the basin 10 which, in certain instances, may be conical as depicted in FIG. 2. Such decanting may be effected also through use of a pump 18 (FIGS. 1 and 2) within a well 20 exteriorly of the basin 10, the pump 18 having an inlet 22 for receiving the water at a point above the lines 12 and 14 and an outlet 24 for directing the water back to the water purification system (not shown) for recirculation therein.

A continuous manifold 26 along the upper edge of the basin 10 is subdivided into sections 26a, 26b, 26c and 26d (FIG. 1) by equally spaced valves 28, 30, 32 and 34. Each of such manifold sections has an inlet tube 36 (FIG. 6) for air under pressure, and each tube 36 is provided with a valve 28. The source of such low pressure air (not shown) from a compressor, storage tank or otherwise is of no particular consequence to the present invention.

Each of a series of radial pipes 40 has a swivel connection 42 with an upstanding conduit 44 such that the inclined pipes 40 remain in engagement with the bottom 16, and each pipe 40 terminates in an inner end 46 (FIG. 5) spaced outwardly from the center or apex of the bottom 16. Each conduit 44 has a lateral 48 at its upper end connecting with the manifold 26 and provided with a valve 50. All of the valves above referred to may be of the common, manually actuated, global type or the like by which the flow of air may be started, stopped or regulated by a movable part (not shown) that opens, shuts or partially obstructs the corresponding passageways in which they are located.

Each pipe 40 has a series of double outlet orifices 52 spaced along the length thereof with each pair of orifices 52 of each pipe 40 disposed in staggered relationship to the orifices 52 of each next adjacent pipe 40 as shown in FIG. 8. All of the divergent orifices 52 are arranged to direct the streams of air toward the bottom 16 (see FIG. 7), and each of the ends 46 has an outlet port 54 (FIG. 5) for directing air toward the center of the basin 10.

The well 20 also contains a sludge pump 56 (FIG. 1) having an inlet duct 58 extending along the bottom 16 and terminating at the center of the latter, together with an outlet 60 leading to the sludge conveyance means such as a truck tank (not shown).

OPERATION

As above indicated, the sludge to be removed from the basin 10, when produced as the result of water purification, normally contains a high concentrate of caustic lime which usually consists of calcium oxide obtained by calcining common limestone or other form of calcium carbonate. Inasmuch as this bivalent metallic element is a highly infusible solid (although it may also contain magnesia), it is most difficult to liquify or render plastic even when subjected to heat.

In virtually all cases, prior to discharge into the basin 10, the sludge has been formed by sedimentation, with or without alum or the like as a flocculent to cause clumping. Usually the water has not as yet been subjected to bacteria distruction by the addition of chlorine, and taste has not yet been improved with sodium sulphate, although zeolite may have been used in lieu of or in conjunction with the lime to reduce hardness. In any event, the apparatus above described is advantageous regardless of the number and precise nature of the materials and substances within the basin 10.

However, when the percentage of lime in the wet sludge is relatively high with very little water content (previously decanted from the basin 10), it can be likened to an extremely heavy paste or thick, muddy sediment; hence, the prior need for the aforementioned sweep arm.

In the instant process, it is but necessary to subject the sludge to the air treatment in order to condition it for pumping even in instances where the sludge has built up to a depth of nine or more feet, all without need for any agitation whatever over an entire period of many months.

It is usually unnecessary that all of the valves be opened in order to place the sludge in condition for initial removal from the basin 10 by use of the pump 56. At the outset, the valves 28 and 32, for example, may be closed and air admitted only to manifold sections 26a and 26b by opening their corresponding valves 38—38. Also, it has been found advantageous to close every other valve 50 relating to sections 26a and 26b in order to increase the volume and velocity of air flowing in the remaining pipes 40.

In but a short period of time the sludge at the inlet of duct 58 and thereabove throughout the center of the basin 10 and extending upwardly to the level of the sludge will have reached a condition for commencement of withdrawal by use of the pump 56 and be in a diffused state at the apex of the bottom 16, not only by the suction created at the duct 58, and agitation at that point, but by the air eminating from the ports 54. Hence, it is unnecessary to extend the pipes 40 inwardly to the center of the bottom 16, although two or more pipes 40a and 40b may be lengthened if desired as shown in FIG. 1.

Later in the process, it is necessary to operate but one of the manifold sections at a time with all of the valves 50 thereof open. However, it has been found important that in a 50-foot diameter basin 10, for example, using 15-foot pipes 40, the distance between the latter at the manifold 26 should be about three feet. With such multiplicity of the pipes 40, so strategically arranged, the heaviest of sludges can be quickly, easily and inexpensively diffused, notwithstanding the wide expanse of the basin 10, the oftentimes great depths of the sludge, and the usually long period of time during which the sludge builds up within the basin 10. This is not to say, however, that the system cannot be advantageously used in situations wherein the sludge is removed more frequently. Also to be noted, for example, the manifold 26 may well have a 1¼ inch diameter with the pipes 40 and the tubes 36 reduced to about one inch in diameter.

The direction of the air from the orifice 52 toward the bottom 16 eliminates concentrated channeling of the air upwardly through the sludge rather than operate to diffuse the sludge material throughout the mass. Noteworthy also is the fact that the system need not be installed while the basin 10 is empty. The pipes 40 may be laid upon the surface of the sludge; they will slowly sink and come to rest in proper position upon the bottom 16 by virtue of the swivels 42.

Again, it is to be emphasized that while the apparatus and method of the instant invention is especially adaptable for use in connection with heavy lime sludges emanating from water purification plants, many other sludges such as those resulting from sewage treatment and those produced industrially can be handled much more conveniently and inexpensively by employment of the concepts of this invention as distinguished from laborious cleaning practices at the time of sludge removal through pumps or the like and subsequent transportation to a point of use or disposal.

I claim:

1. The method of treating a bed of a relatively dense sludge in the nature of a substantially thick, heavy mass consisting essentially of solid wastes settled from water into a sedimentation basin, said method including the steps of:

injecting air under pressure into said mass at a plurality of locations between the top of the mass and the bottom of the basin at a sufficient velocity and volume to diffuse the mass until it can be handled like a fluid;

thereupon pumping the diffused mass from said basin into a means of conveyance; and then utilizing said conveyance means for transporting the wastes to an area of disposal.

2. The invention of claim 1 wherein said air is injected into the basin at a plurality of locations along the bottom of said basin for upward flow through said mass.

3. The invention of claim 1 wherein said air is piped downwardly into said basin and thence along the bottom of the latter, and is then released below said mass for upward flow through said mass.

4. The invention of claim 1 wherein said air is conveyed between the bottom of said basin and the mass inwardly toward the center of said basin along a plurality of paths, and is then released at a number of points along each path for upward flow through said mass.

5. The invention of claim 4 wherein each air release along each path is staggered from each air release of each next adjacent path.

6. The invention of claim 4 wherein the air release at each point is divided into a pair of divergent streams directed toward said bottom of the basin.

7. The invention of claim 4 wherein the air is released at each point for flow in a stream directed toward said bottom of the basin.

8. The invention of claim 7 wherein said air is also released at the inner end of each path for flow in a stream directed toward said center of the basin.

9. The invention of claim 8 wherein the release of the air at said inner ends of said paths is spaced outwardly from said center of the basin.

10. The invention of claim 1 wherein said air is first directed from a common source for flow along the periphery of said basin, is then conveyed downwardly from said periphery to the bottom of the basin, is thereupon directed inwardly below the mass toward the center of said bottom of the basin along a plurality of paths spaced along the entire bottom of the basin, and is thereupon released from each path respectively for upward flow through said mass.

11. The invention of claim 10 wherein the air is selectively controlled along said periphery for flow to one or more of a number of groups of said paths.

12. The invention of claim 10 wherein the air from said periphery is controlled for flow along preselected paths.

13. Apparatus for treating a bed of a relatively dense sludge in the nature of a substantially thick, heavy mass consisting essentially of solid wastes settled from water into a sedimentation basin, said apparatus including:

a system of pipes interposed between the bottom of the basin and the mass, said system including a series of said pipes spaced along the entire bottom of the basin, each extending inwardly toward the center of the basin; and means for conveying air under pressure into said pipes, each pipe having outlet means for injection of the air into said mass until the latter is sufficiently diffused for pumping like a fluid from said basin, said outlet means of each pipe including a pair of diverging orifices directed toward said bottom of the basin.

14. The invention of claim 13, said air conveying means including a manifold at the periphery of said basin, said manifold being common to and coupled with said pipes.

15. The invention of claim 14 said manifold being above said bottom of the basin, said conveying means including an upright conduit interconnecting each pipe respectively with said manifold.

16. The invention of claim 15, said bottom of the basin being conical, the connection between each conduit and its corresponding pipe including a swivel for swinging movement of each pipe to a downwardly and inwardly inclined position resting on said conical bottom.

17. The invention of claim 14; and a plurality of spaced shut-off valves in said manifold subdividing the latter into a number of sections for controlling flow of said air to one or more groups of said pipes, each section having a valved air inlet tube.

18. The invention of claim 17; and a shut-off valve in each pipe respectively.

19. The invention of claim 13, each pipe terminating in an inner end spaced outwardly from said center of the basin, each outlet means including a port in each of said inner ends.

20. The invention of claim 13, each pair of orifices of each pipe being in staggered relationship to each pair of orifices of each next adjacent pipe.

* * * * *